United States Patent
Schuster et al.

(10) Patent No.: US 10,724,768 B2
(45) Date of Patent: Jul. 28, 2020

(54) SYSTEMS AND METHODS FOR PROVIDING CONTINUOUS COOLING AT CRYOGENIC TEMPERATURES

(71) Applicant: THE UNIVERSITY OF CHICAGO, Chicago, IL (US)

(72) Inventors: David I. Schuster, Chicago, IL (US); Andrew E. Oriani, Houston, TX (US)

(73) Assignee: THE UNIVERSITY OF CHICAGO, Chicago, IL (US)

(*) Notice: Subject to any disclaimer, the term of this patent is extended or adjusted under 35 U.S.C. 154(b) by 249 days.

(21) Appl. No.: 15/605,701

(22) Filed: May 25, 2017

(65) Prior Publication Data

US 2017/0343252 A1 Nov. 30, 2017

Related U.S. Application Data

(60) Provisional application No. 62/341,530, filed on May 25, 2016.

(51) Int. Cl.
*F25B 17/08* (2006.01)
*F25B 25/00* (2006.01)
(Continued)

(52) U.S. Cl.
CPC ............ *F25B 17/083* (2013.01); *F25B 25/00* (2013.01); *F25B 9/02* (2013.01); *F25B 9/10* (2013.01);
(Continued)

(58) Field of Classification Search
CPC ...... F25B 9/02; F25B 9/10; F25B 9/12; F25B 9/145; F25B 17/083; F25B 17/086;
(Continued)

(56) References Cited

U.S. PATENT DOCUMENTS 1,833,901 A * 12/1931 Hull ..................... F25B 17/083
62/335
4,183,227 A * 1/1980 Bouvin .................. F25B 17/08
62/480

(Continued)

FOREIGN PATENT DOCUMENTS

| EP | 1 785 680 A1 | 5/2007 |
| EP | 1 387 133 B1 | 3/2009 |

OTHER PUBLICATIONS

Bradley et al., "A High Power, Low Heat Leak Dilution Refrigerator for Use with Nuclear Cooling," Physica 107B: 561-562 (1981).

(Continued)

*Primary Examiner* — Eric S Ruppert
*Assistant Examiner* — Hans R Weiland
(74) *Attorney, Agent, or Firm* — Marshall, Gerstein & Borun LLP (57) ABSTRACT

Systems and methods of continuous cooling at cryogenic temperatures. One exemplary aspect involves a refrigeration system that includes: a chamber adapted to hold liquid and gaseous coolant received from a cooling pot; a first adsorption pump having an inlet end in fluid communication with the chamber, the first adsorption pump configured to capture gas from the liquid and gaseous coolant when the first adsorption pump is enabled; a second adsorption pump having an inlet end in fluid communication with the chamber, the second adsorption pump configured to capture gas from the liquid and gaseous coolant when the second adsorption pump is enabled; a first heater or heat switch for desorbing the gas captured by the first adsorption pump; and a second heater or heat switch for desorbing the gas captured by the second adsorption pump.

21 Claims, 3 Drawing Sheets

(51) Int. Cl.
 *F25B 25/02* (2006.01)
 *F25B 9/14* (2006.01)
 *F25B 35/04* (2006.01)
 *F25B 9/02* (2006.01)
 *F25B 9/10* (2006.01)

(52) U.S. Cl.
 CPC .............. *F25B 9/145* (2013.01); *F25B 25/02* (2013.01); *F25B 35/04* (2013.01); *Y02A 30/278* (2018.01); *Y02B 30/64* (2013.01)

(58) Field of Classification Search
 CPC .......... F25B 25/00; F25B 25/02; F25B 35/04; Y02A 30/278; Y02B 30/64
 See application file for complete search history.

(56) References Cited

U.S. PATENT DOCUMENTS

| | | | | |
|---|---|---|---|---|
| 4,366,680 | A * | 1/1983 | Tward | F25B 17/083 62/46.1 |
| 4,831,829 | A * | 5/1989 | Jones | F25B 17/083 62/3.2 |
| 5,060,482 | A * | 10/1991 | Jackson | F25B 9/12 62/467 |
| 5,070,702 | A * | 12/1991 | Jackson | F25B 17/083 62/610 |
| 5,477,706 | A * | 12/1995 | Kirol | C09K 5/047 62/480 |
| 6,782,712 | B2 * | 8/2004 | Mikheev | F25B 17/08 62/106 |
| 8,464,542 | B2 * | 6/2013 | Hilton | F25B 9/12 62/46.1 |
| 2014/0137571 | A1 * | 5/2014 | Petroff | F25B 9/12 62/6 |

OTHER PUBLICATIONS

Cousins et al., An Advanced Dilution Refrigerator Designed for the New Lancaster Microkelvin Facility,: Journal of Low Temperature Physics, 114(516):547-570 (1999).

Mohandas et al., "Continuously Operating Cryogenic Cycle Dilution Refrigerator," Physica B, 194-196:55-56 (1994).

Oda et al., "Practical Design of Heat Exchanges for Dilution Refrigerators 1," Cryogenics, 18(2):73-78 (1978).

Oda et al., "Practical Design of Heat Exchanges for Dilution Refrigerators: Part 2," Cryogenics, 23(2):139-147 (1983).

Pobell, "Matter and Methods at Low Temperatures," Springer, Third Ed., pp. 141-147 (2007).

Pollanen et al., "Low Temperature Thermal Resistance for a New Design of Silver Sinter Heat Exchanger," Journal of Physics Conference Series (2008).

* cited by examiner

SYSTEMS AND METHODS FOR PROVIDING CONTINUOUS COOLING AT CRYOGENIC TEMPERATURES

RELATED APPLICATION

The present application claims priority to U.S. Provisional Patent Application No. 62/341,530, filed May 25, 2016, the entirety of which is hereby incorporated herein by reference.

FIELD OF THE DISCLOSURE

The present disclosure generally relates to cooling systems and methods, and, more particularly, to systems and methods for providing continuous cooling at cryogenic temperatures.

BACKGROUND

Refrigeration systems which utilize the compression, expansion, liquidification, and evaporation of a working fluid to effect cooling below atmospheric temperatures are ubiquitous, constituting the bulk of such systems. In most systems, the compression and expansion (often used to help facilitate liquidification and evaporation) are enabled by mechanical compressor/pumps. These systems though effective, are costly, energy intensive, and require significant maintenance. This is particularly felt in cryogenic applications where it is difficult to operate the mechanical pumps with in the cryogenic environment and passing the working fluid between the cryogenic and atmospheric environment entails significant cost in terms of complexity and performance.

For applications where the performance or weight/complexity costs cannot be tolerated, cryogenic systems often use adsorption pumps for refrigeration. Such pumps typically include an adsorbent, such as activated charcoal or zeolite, that captures gas from the working fluid. However, adsorption pumps are limited by the fact that the adsorbent can only adsorb or capture a finite amount of gas. Once the adsorbent has reached this point, the adsorbent, and more generally the adsorption pump, is no longer operational. Then, the adsorbed or captured gas must be desorbed, typically by heating the adsorbent. Heating the adsorbent in the required manner causes the entire refrigeration system to be heated to higher than desired temperatures often for several hours at a time, making the system unusable for applications which require continuous usage.

Some attempts have been made to address the limitations of adsorption pumps for cryogenic cooling. A typical approach is to have two pumps and two separate chambers containing working fluid, essentially building two refrigeration systems. The two systems are then alternated, whereby one is run while the other is desorbed. Each refrigerator is attached to a common cold plate via a heat switch, which connects or isolates the refrigerator from the cold plate. While this works, heat switches become less effective (especially when in the conductive state) as temperatures are lowered, limiting the performance of such refrigeration systems, negating many of the advantages of adsorption refrigerators. Secondly, all of this engineering must be done at the coldest, most sensitive stage of the system.

DETAILED DESCRIPTION

The methods and systems described here use adsorption pumps for distillation and refrigeration, where the desorbed gas is isolated from the cooling system, typically by one or more valves. If the gas is returned to the system, a condenser is used to efficiently cool the gas before it is returned. In this manner, only the pumping and compression aspects need to be modified, and these modifications can be made at any temperature at which the adsorption process works. Importantly, no modifications need be made to many conventional designs at the lowest temperature stages, which is especially important at the lowest temperatures. Such designs would allow the elimination of all external gas handling components of many cryogenic refrigeration systems, which drive much of the cost, power, weight, and maintenance requirements associated with these systems. Such systems could support a variety of cooling platforms including but not limited to continuous cooling and/or distillation of liquid cryogens (e.g. $^4$He, $^3$He, $H_2$, N, Ne, Ar, Xe, liquid natural gas, et. al.) or in support of other cooling systems, such as adiabatic demagnetization refrigeration, etc.

While the method and systems described here can be employed with conventional liquefied cryogens, with the advent of commercially available closed-cycle cryocoolers, the method and systems can be optimized to take advantage of the unique aspects of closed-cycle cryocoolers not available to systems before their invention and availability. A key difference between closed-cycle cryocoolers and liquid cryogen systems is that the former provide cooling power, which only weakly determines the energy consumption, whereas the latter is a store of entropy (energy as heat capacity). Thus when optimizing a system for use with liquid cryogens, any power utilization affects both whether the system will work at all and hold time, which is the main driver for both maintenance and energy costs. In a closed cycle system, the refrigerator need only run within the power envelope of the specified cryocooler. The former often imposes a severe trade-off between performance and rejected heat, which has limited most prior systems to niche markets. In contrast, the present invention exploits this new efficiency calculus to engineer a system that is both continuous, low maintenance, and offers higher performance than both conventional mechanical and adsorption systems.

In addition, cryocoolers have several other unique and useful features, such as the availability of continuous temperature gradients with corresponding amounts of cooling power and efficiency, allowing one to create efficient heat exchangers and utilize cooling power optimally.

Figure 1:
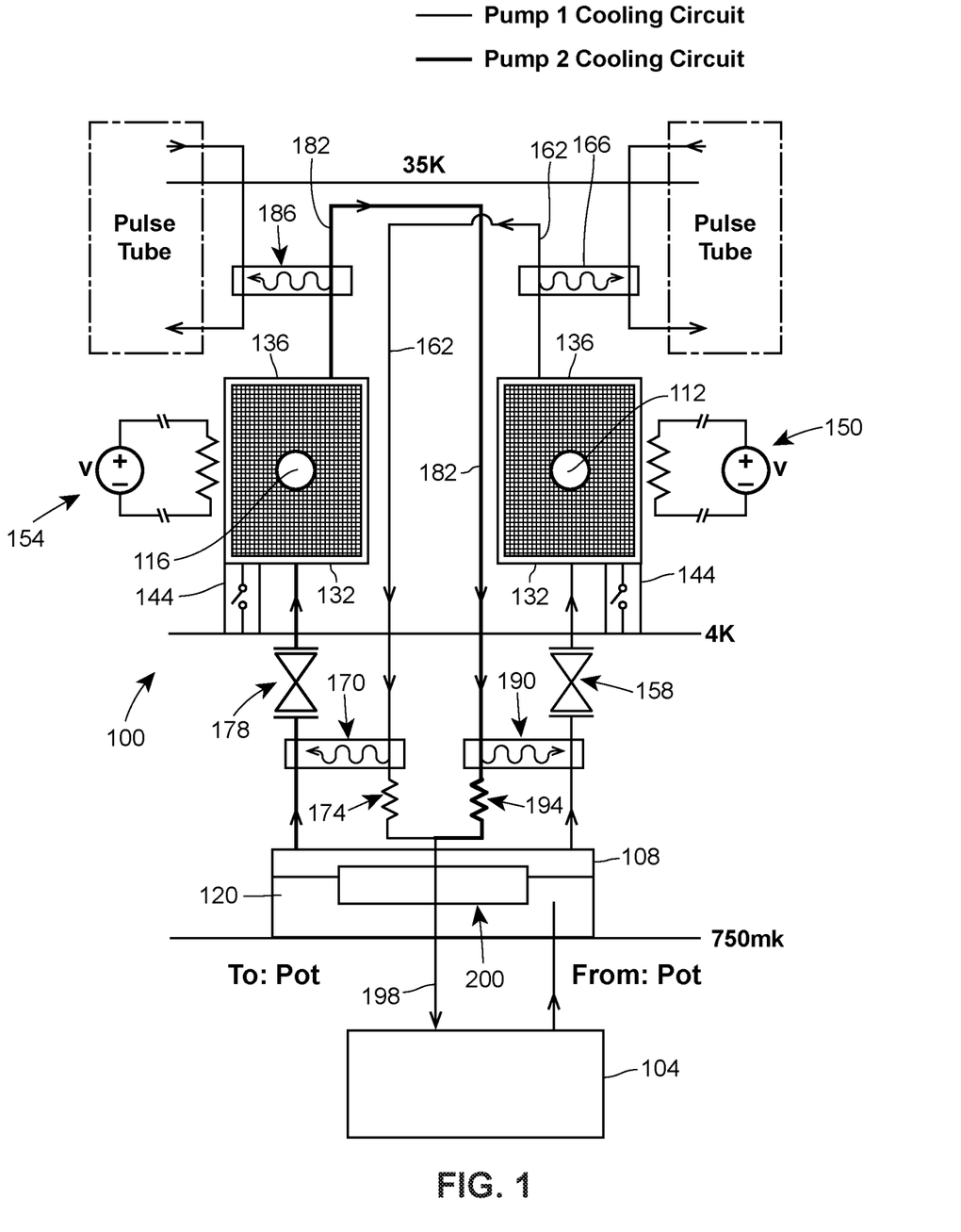
FIG. 1 is a schematic diagram of one example of a refrigeration system, constructed in accordance with the teachings of the present disclosure, for providing continuous cooling at cryogenic temperatures utilizing a pair of independently operable and thermally isolated adsorption pumps.

FIG. 1 depicts an example of a closed refrigeration system 100 constructed in accordance with the teachings of the present disclosure. The refrigeration system 100 generally utilizes a pair of independently controllable adsorption pumps that are thermally isolated from one another, and, at the same time, provide minimal undue heat load at very low temperatures, such that the refrigeration system 100 can provide energy-efficient continuous cooling at cryogenic temperatures, e.g., temperatures below 10 K, 4 K, 2 K, 700 mK, 100 mK, or other temperatures above or below any of these values.

Figure 2A:
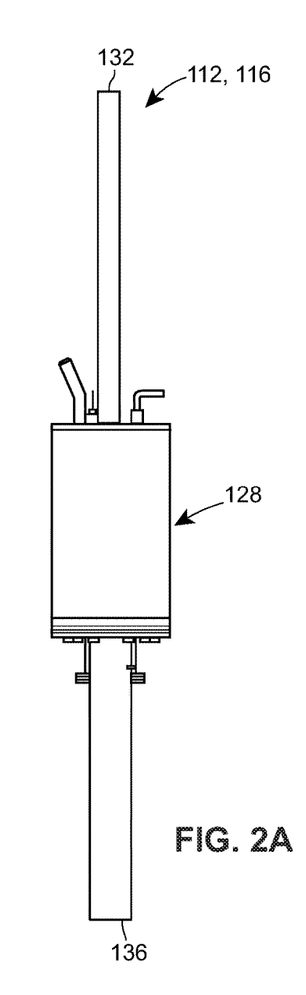
FIG. 2A is a plan view of one example of an adsorption pump that can be utilized in the refrigeration system of FIG. 1.
Figure 2B:
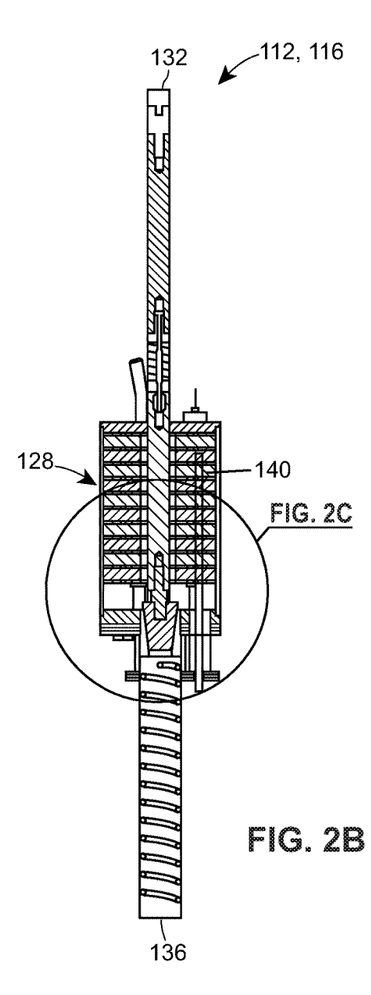
FIG. 2B is a cross-sectional view of FIG. 2A.
Figure 2C:
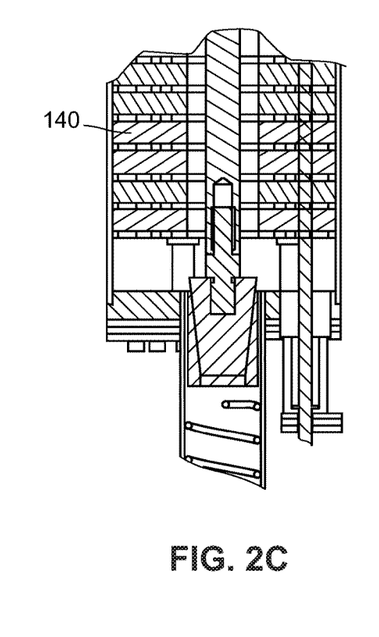
FIG. 2C is a partial view of FIG. 2B, showing an adsorbent material of the adsorption pump.

As illustrated in FIG. 1, the refrigeration system 100 generally includes a cooling pot 104, a chamber 108, a first adsorption pump 112, and a second adsorption pump 116. The cooling pot 104, which may, for example, take the form of a dilution unit, is generally known in the art, so is only generically illustrated in FIG. 1 and is not described in any further detail. The chamber 108 is generally configured to hold liquid and gaseous coolant 120, e.g., isotopes of helium, received from the cooling pot 104. Alternatively, the chamber 108 can be configured to hold other liquid and gaseous mixtures, e.g., liquid and gaseous mixtures including isotopes of helium, other elements, or miscible liquids. The first and second adsorption pumps 112, 116, which are identical in structure and at least in this example take the form of the pump illustrated in FIGS. 2A-2C, are each configured to selectively capture or adsorb gas from the liquid and gaseous coolant, thereby lowering the temperature of the coolant in the chamber 108. As discussed above, the first and second adsorption pumps 112, 116 can be operated independently of one another and can be thermally isolated from one another so as to provide continuous cooling at cryogenic temperatures in a manner that does not impair the performance of the refrigeration system 100.

As best illustrated in FIGS. 2A-2C, the first and second adsorption pumps 112, 116 in this example each include, in relevant part, a housing 128 having an inlet end 132, an outlet end 136 arranged opposite the inlet end 132, and an adsorbent 140 arranged between the inlet end 132 and the outlet end 136. The housing 128 in this example is made of or manufactured from Stainless Steel 316, which is known for its high fatigue strength and improved fatigue properties at cryogenic temperatures. The adsorbent 140, which in this example takes the form of activated carbon due to its well characterized isothermal adsorption properties, is held at a temperature (e.g., by a heat switch 144) that is sufficiently low so as to facilitate capture or adsorption of the gas, when desired. In other examples, the adsorbent 140 can take the form of charcoal or any other material suitable for extracting gas from the liquid and gaseous coolant in the chamber 108.

With reference back to FIG. 1, the refrigeration system 100 in this example also includes a first heater 150 coupled to the first adsorption pump 112 and a second heater 154 coupled to the second adsorption pump 116. The first heater 150 is configured to selectively desorb the gas captured by the first adsorption pump 112 by heating the adsorbent 140 of the first adsorption pump 112 to a temperature that is sufficiently high enough to allow for full desorption of the first adsorption pump 112. Likewise, the second heater 154 is configured to selectively desorb the gas captured by the second adsorption pump 116 by heating the adsorbent 140 of the second adsorption pump 116 to a temperature that is sufficiently high enough to allow for full desorption of the second adsorption pump 116.

The refrigeration system 100 also includes a first isolation valve 158 that selectively fluidly couples the inlet end 132 of the first adsorption pump 112 with the chamber 108, and a first condensing line 162 that is arranged between the chamber 108 and the outlet end 136 of the first adsorption pump 112. The first condensing line 162 is generally configured to condense and then cool gas desorbed from the first adsorption pump 112, thereby producing a liquid, and then pass that liquid to the chamber 108. In this example, the first condensing line 162 condenses and then cools the gas by passing the gas through a first condenser 166, a first heat exchanger 170 arranged downstream of the first condenser 166, and a first expansion valve 174, which in this example takes the form of a Joule-Thomson expansion valve, arranged downstream of the first condenser 166 and the first heat exchanger 170. In other examples, the first condensing line 162 may condense and cool the gas in a different manner, e.g., by passing the gas through one or two of the first condenser 166, the first heat exchanger 170, and the expansion valve 174, and/or through one or more different components.

The refrigeration system 100 also includes a second isolation valve 178 that selectively fluidly couples the inlet end 132 of the second adsorption pump 116 with the chamber 108, and a second condensing line 182 that is arranged between the chamber 108 and the outlet end 136 of the second adsorption pump 116. The second condensing line 182 is generally configured to condense and then cool gas desorbed from the second adsorption pump 116, thereby producing a liquid, and then pass that liquid to the chamber 108. In this example, the second condensing line 182 condenses the gas by passing the gas through a second condenser 186, a second heat exchanger 190 arranged downstream of the second condenser 186, and a second expansion valve 194, which in this example takes the form of a Joule-Thomson expansion valve, arranged downstream of the second condenser 186 and the second heat exchanger 190. In other examples, the second condensing line 182 may condense the gas in a different manner, e.g., by passing the gas through one or two of the second condenser 186, the second heat exchanger 190 and the second expansion valve 194, and/or through one or more different components.

It will be appreciated that each of the first and second isolation valves 158, 178 has the ability to withstand cyclic loading caused by a change in the internal pressure of the respective adsorption pump 112, 116, and each of the valves 158, 178 can cycle without degradation of their sealing abilities due to wear. Moreover, each of the first and second isolation valves 158, 178 is actuated by way of an actuation means, e.g., a linear motor located at room temperature, that imparts little to no thermal load, and produces minimal, if any, electromagnetic noise and mechanical vibrations. The valves could be actuated by several magnetic or non-magnetic actuation means including, but not limited to, magnetic solenoids, piezo actuators, magnetic motors, piezo-electric motors, or manually, at room temperature or cryogenically. Isolation might also be provided by other means such as a porous material whose pore size could be modulated in-situ, or other equivalent mechanisms. Valves could also be of several types, including but not limited to gate valves, ball valves, diaphragm valves, solenoid valves and could be of varying types such as check valves, or multi-way valves.

The refrigeration system 100 further includes a third condensing line 198 that passes the condensed (and now liquid) coolant from the first and second condensing lines 162, 182 to a third heat exchanger 200 arranged within the chamber 108. The third heat exchanger 200 serves to further cool the condensed coolant to the temperature of the coolant in the chamber 108. The third condensing line 198 is formed by the intersection of the first and second condensing lines 162, 182 at a position downstream of the first and second expansion valves 174, 194; this ensures that the impedance going back into the adsorbing pumps 112, 116 will be high enough to prevent any leakage from the pumps 112, 116, but, if any such leakage does occur, the leakage will not significantly warm either the condensed liquid or the adsorbent 140 of the first and second pumps 112, 116.

With reference still to FIG. 1, the operation of the refrigeration system 100 will now be described. Initially, both the first and second isolation valves 158, 178 will be in a closed position or state, with the result that no coolant flows through the refrigeration system 100. However, when the first isolation valve 158 is moved to an open position or state, the liquid and gaseous coolant in the chamber 108 is exposed to the first adsorption pump 112, such that the gas from the liquid and gaseous coolant flows through, and is captured or adsorbed by, the adsorbent 140 of the first adsorption pump 112. Adsorption of the gas from the liquid and gaseous coolant in this manner serves to lower the temperature of the coolant in the chamber 108. This continues until the adsorbent 140 of the first adsorption pump 112 is saturated (i.e., the adsorbent 140 has reached its adsorption limit), at which time the first isolation valve 158 is moved to the closed position.

Responsive to the closing of the first isolation valve 158, the second isolation valve 178 is moved to an open position and, at substantially the same time, the first heater 150 begins desorbing the gas captured by the first adsorption pump 112. Moving the second isolation valve 178 to the open position exposes the liquid and gaseous coolant in the chamber 108 to the second adsorption pump 116, such that the gas from the liquid and gaseous coolant flows through, and is captured or adsorbed by the adsorbent 140 of the second adsorption pump 116. Adsorption of the gas from the liquid and gaseous coolant in this manner serves to lower the temperature of the coolant in the chamber 108. This continues until the adsorbent 140 of the second adsorption pump 116 is saturated (i.e., the adsorbent 140 has reached its adsorption limit). While the second adsorption pump 116 captures or adsorbs gas, the first heater 150 desorbs the gas captured by the first adsorption pump 112 by heating the adsorbent 140 of the first adsorption pump 112. The desorbed gas is in turn passed through the first condensing line 162, which condenses and cools the gas, turning it into a liquid; the liquid is subsequently passed back to the chamber 108 in the manner described above.

Of course, this cycle can be repeated any number of times. Thus, as an example, when the adsorbent 140 of the second adsorption pump 116 is saturated, the second isolation valve 178 can be closed, and, at substantially the same time, the first isolation valve 178 can be reopened, starting the cycle all over again. It will be appreciated that this cycling is performed in a closed manner, i.e., the amount of coolant within the refrigeration system 100 remains constant. Thus, as an example, no gas needs to be handled external to the refrigeration system 100. In other words, none of the coolant needs to be allowed to warm up to a temperature above 30K and then cooled again, as is this case with externally pumped cryogenic systems. This obviates the need for larger equipment, which would otherwise be required to process coolant in this manner, and facilitates significant energy savings.

Furthermore, it will be appreciated that the refrigeration system 100 can vary from the system 100 and yet still perform as intended. More specifically, the components of the refrigeration system 100—the first and second adsorption pumps 112, 116; the first and second heaters 150, 154; the first and second isolation valves 158, 162; and the first and second condensing lines 162, 182—can vary from what is described and illustrated herein. As an example, the first and second heaters 150, 154 can instead take the form of a heat switch that allows coupling to warmer elements so as to facilitate the desired desorption. As another example, the first and second isolation valves 158, 162 can instead take the form of a check valve or some other component suitable for facilitating selective fluid communication. As yet another example, the first and second expansion valves 174, 194 can instead take the form of an impedance valve or other suitable valve. Additionally, the refrigeration system 100 can include more or less components. As an example, the refrigeration system 100 need not include the first and second expansion valves 174, 194.

Finally, it will be appreciated that the refrigeration system 100 can be utilized in any number of applications to provide continuous cooling at cryogenic temperatures. The refrigeration system 100 can, for example, be utilized or incorporated into a space-based vehicle, e.g., a satellite, for astrophysics applications, espionage applications, or other space-related applications. Alternatively, the refrigeration system 100 can be utilized for or in land-based applications, e.g., for general characterization experiments, mass spectrometry, cryogenic sensors.

Figure 3A:
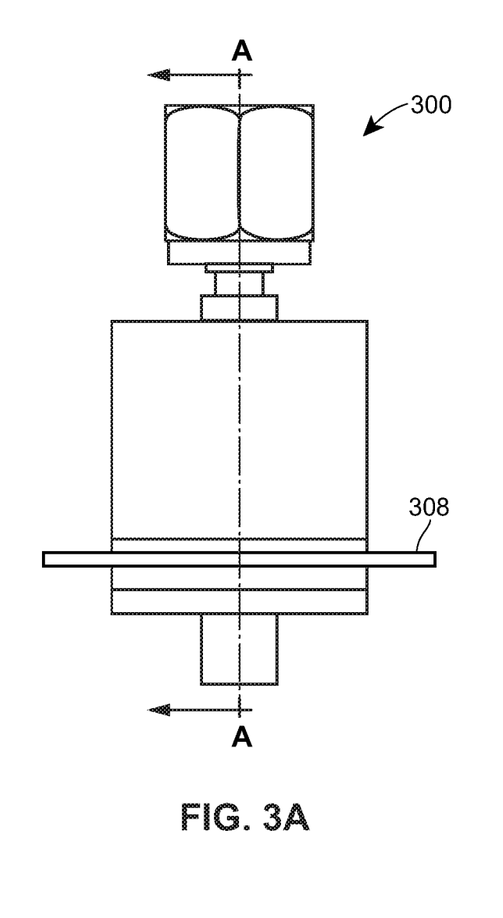
FIG. 3A is a plan view of one example of an isolation valve that can be utilized in the refrigeration system of FIG. 1.
Figure 3B:
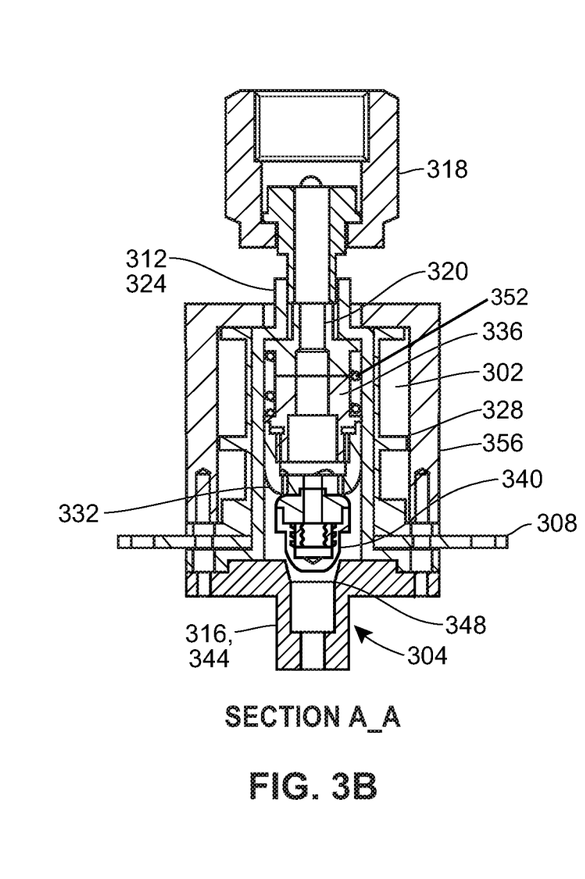
FIG. 3B is a cross-sectional view of FIG. 3A, taken along line A-A.

FIGS. 3A and 3B illustrate one example of a solenoid valve 300 that can be used to implement the first isolation valve 158 and/or the second isolation valve 178. As will be discussed in greater detail below, the solenoid valve 300 is preferably actuated by an in-situ magnetic solenoid 302 that is operable to actuate the isolation valve 300 electromagnetically, such that the valve 300 can be actuated without having to feed any wiring through the inside of the valve 300. Of course, it will be appreciated that the solenoid valve 300 can alternatively be actuated using any of the actuation means discussed above.

The solenoid valve 300 includes a valve body 304 and flanges 308 that are attached to the valve body 304 for mounting the solenoid valve 300 in the desired position and are capable of withstanding high pressures. The valve body 304 preferably takes the form of a tube defined by a first body portion 312 and a second body portion 316 coupled to the first body portion 312 via, for example, welding or an indium wire seal. The solenoid valve 300 in this example includes a connector 318 coupled to the second body portion 316 to facilitate hermetic sealing of the valve body 304.

The solenoid valve 300 also includes a first magnetic component 320 (e.g., a piece of iron) statically arranged at or near one end 324 of the valve body 304 and an armature 328 that is generally centrally located in the valve body 304 and moves, axially to the flow of gas, relative to the static magnetic component 320. The armature 328 in this example includes three components—a core 332 (e.g., made of stainless steel), a second magnetic component 336 (e.g., a piece of soft iron) attached to a first portion of the core 332, and a valve disk 340 attached to a second portion of the core 332 opposite the first portion of the core 332. The core 332 helps to guide the armature 328 through the valve body 304 when the armature 328 is actuated (e.g., when the valve 300 is placed in a magnetic field). When this happens, the second magnetic component 336 is attracted to and moves toward the first magnetic component 320. In turn, the disk 340, which is arranged at or near end 344 of the valve body 304, moves away from a valve seat 348 and to an open position (not shown), thereby opening the valve 300 and allowing the gas to move around the disk 340 and through the valve body 304. To return the core 332 and the valve disk 340 to a closed position, shown in FIG. 3B, the solenoid valve 300 includes a biasing element 352, e.g., a stainless steel return spring). The biasing element 352 is preferably located behind the movable core 332.

As illustrated in FIG. 3B, the solenoid 302 is arranged around the valve body 304. When the solenoid 302 is energized, the solenoid 302 induces a magnetic field that attracts the first and second magnetic components 320, 336, overcoming the opposing force applied by the biasing element 352, lifting the valve disk 340 from the valve seat 348 and opening the valve 300. To help focus the magnetic field of the solenoid 302 to the valve body 304 (particularly the magnetic component 336), a metal yoke 356 (e.g., made of iron) is disposed around the solenoid 302, such that the metal yoke 356 surrounds the solenoid 302. The metal yoke 356 also helps to prevent any stray magnetic flux from interfering with nearby electronics or other sensitive equipment.

Beneficially, the isolation valve 300 is operable, over numerous cycles, at cryogenic temperatures without sacrificing desirable elastic properties and mechanical robustness and while reducing undue heat load during actuation. This is possible because the valve disk 340 is made of Vespel SP-1, which is a durable, high-performance elastomeric material that has outstanding wear properties, ultra-low creep, and offers dimensional and mechanical stability even at sub-kelvin temperatures, and the valve seat 348 is made of a material such as austenitic stainless steel which has improved toughness at cryogenic temperatures. The seat 348 is preferably highly polished with diamond lap while the disk 340 is left with a very fine machined finish. The disk 340 and the seat 348 are preferably sized to allow for high enough pressure at the sealing interface for sufficient elastic yielding to create an atomically gas tight seal when the valve 300 is closed. The seat 348 also preferably has a slightly curved lip to reduce the chances of misalignment with the disk 340, preventing subsequent gas leakage when the valve 300 returns to its closed position.

While the valve disk 340 described herein is made of Vespel SP-1, it will be appreciated that the valve disk 340 can alternatively be made of another durable, high-performance elastomeric material. As an example, the valve disk 340 can be made of Meldin, Plavis, Sumika, Duratron, or any other suitable polymide substance. Similarly, while the seat 348 described herein is made of austenitic stainless steel, the valve seat 348 can alternatively or additionally be made of one or more other materials that offer improved toughness at cryogenic temperatures.

Because of the material used to form the valve disk 340 is harder than other commonly used sealing materials, a relatively strong biasing element 352 is preferably utilized to provide ample sealing pressure. As a result, a relatively strong magnetic field, e.g., a field having a strength of several kilogauss (0.1-0.4 Tesla), is preferably utilized to oppose the spring force applied by the biasing element 352 and actuate the valve 300. While this spring force could be overcome by using larger magnetic components 320, 336, it is generally desirable to minimize the overall size of these components. Additionally, inducing this magnetic field with a traditional copper solenoid coil would cause unwanted heat load at low-temperatures (e.g., 10 watts at 4K). Thus, to both minimize the size of the components 320, 336 and minimize heat load, the solenoid 302 in this example is made of copper sheathed niobium-titanium superconducting wire (NbTi—SC). Of course, in other examples, the wire of the solenoid 302 can be made of another type II superconductor (e.g., niobium-tin, cuprate-perovskite ceramic materials), a type I superconductor, or any other suitable superconductor.

Because of NbTi's very high critical current, on the order of 10 s of amps for wire ~100 μm in diameter, a very thin wire and subsequently a much higher turn density can be achieved. This in turn allows for very compact and efficient solenoid coils, considerably minimizing the overall size of the valve. Furthermore, because of the lossless nature of the superconducting wire of the solenoid 302, heat load from actuating the valve 300 is effectively eliminated, allowing the valve 300 to be opened for extended periods of time without causing any noticeable effects to the overall cooling capacity of the cryostat. Combined with high-temperature superconducting leads, heat load from higher stages can be reduced to negligible levels even while energizing the coil 302 with high currents.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

Accordingly, this invention includes all modifications encompassed within the spirit and scope of the invention as defined by the following aspects, which represent a non-exhaustive listing of examples or embodiments of the invention, and the appending claims.

Aspect 1: A refrigeration system that provides continuous cooling at cryogenic temperatures, the refrigeration system comprising: a chamber adapted to hold liquid and gaseous coolant received from a cooling pot; a first adsorption pump having an inlet end in fluid communication with the chamber, the first adsorption pump configured to capture gas from the liquid and gaseous coolant when the first adsorption pump is enabled; a second adsorption pump having an inlet end in fluid communication with the chamber, the second adsorption pump configured to capture gas from the liquid and gaseous coolant when the second adsorption pump is enabled; a means for desorbing the gas captured by the first adsorption pump; and a means for desorbing the gas captured by the second adsorption pump.

Aspect 2: The refrigeration system of aspect 1, further comprising a valve configured to isolate the first and second adsorption pumps from the cooling pot while the gas captured by the first and second adsorption pumps is desorbed.

Aspect 3: The refrigeration system of aspect 1, further comprising a first valve configured to isolate the first adsorption pump from the cooling pot while the gas captured by the first adsorption pump is desorbed, and a second valve configured to isolate the second adsorption pump from the cooling pot while the gas captured by the second adsorption pump is desorbed.

Aspect 4: The refrigeration system of aspect 3, wherein the first and second valves comprise first and second check valves.

Aspect 5: The refrigeration system of any one of the preceding aspects, further comprising a closed cycle cryocooler arranged to dissipate heat generated by the adsorption.

Aspect 6: The refrigeration system of any one of aspects 1 to 4, further comprising a liquid cryogen bath arranged to dissipate heat generated by the adsorption.

Aspect 7: The refrigeration system of any one of the preceding aspects, wherein the means for desorbing the gas captured by the first adsorption pump comprises a first heater or a first heat switch.

Aspect 8: The refrigeration system of any one of the preceding aspects, wherein the means for desorbing the gas captured by the second adsorption pump comprises a second heater or a second heat switch.

Aspect 9: The refrigeration system of any one of the preceding aspects, wherein each of the first and second adsorption pumps comprise an adsorbent that captures the gas from the liquid and gaseous coolant.

Aspect 10: The refrigeration system of aspect 9, further comprising first and second heat switches configured to control the temperature of the adsorbent of the first and second adsorption pumps, respectively.

Aspect 11: The refrigeration system of any one of the preceding aspects, wherein the cooling pot comprises a dilution unit.

Aspect 12: The refrigeration system of any one of the preceding aspects, wherein the liquid and gaseous coolant comprises Helium with isotopic weight 3.

Aspect 13: The refrigeration system of any one of the preceding aspects, wherein the liquid and gaseous coolant comprises Helium with isotopic weight 4.

Aspect 14: The refrigeration system of any one of the preceding aspects, further comprising means for condensing the gas desorbed from the first adsorption pump and means for condensing the gas desorbed from the second adsorption pump.

Aspect 15: The refrigeration system of aspect 14, wherein the means for condensing the gas desorbed from the first adsorption pump comprises at least one of a first heat exchanger and a first expansion valve arranged between an outlet end of the first adsorption pump and the chamber.

Aspect 16: The refrigeration system of aspect 15, wherein the means for condensing the gas desorbed from the first adsorption pump comprises the first heat exchanger and the first expansion valve.

Aspect 17: The refrigeration system of any one of the preceding aspects, further comprising means for condensing the gas desorbed from the second adsorption pump.

Aspect 18: The refrigeration system of aspect 17, wherein the means for condensing the gas desorbed from the second adsorption pump comprises at least one of a second heat exchanger and a second expansion valve arranged between an outlet end of the second adsorption pump and the chamber.

Aspect 19: The refrigeration system of aspect 18, wherein the means for condensing the gas desorbed from the second adsorption pump comprises the second heat exchanger and the second expansion valve.

Aspect 20: The refrigeration system of any one of aspects 14 to 19, further comprising a condensing line, wherein the cooling pot and the condensing line are arranged to pass liquid produced by the means for condensing the gas desorbed from the first adsorption pump and liquid produced by the means for condensing the gas desorbed from the second adsorption pump to the cooling pot.

Aspect 21: The refrigeration system of aspect 20, further comprising a third heat exchanger arranged in the chamber and along the condensing line, the third heat exchanger configured to cool the liquid to the temperature of the liquid and gaseous coolant in the chamber.

Aspect 22: The refrigeration system of any one of the preceding aspects, wherein the refrigeration system is configured for space-based applications.

Aspect 23: The refrigeration system of any one of the preceding aspects, wherein the refrigeration system is configured for land-based applications.

Aspect 24: The refrigeration system of any one of the preceding aspects, wherein no gas is handled external to the refrigeration system.

Aspect 25: A system for distillation of dissolved gases comprising: a chamber adapted to hold liquid and gaseous mixture from a distillation pot; a first adsorption pump having an inlet end in fluid communication with the chamber, the first adsorption pump configured to capture gas from the liquid and gaseous mixture when enabled, thereby changing the composition of the mixture in the chamber; a second adsorption pump having an inlet end in fluid communication with the chamber, the second adsorption pump configured to capture gas from the liquid and gaseous mixture when enabled, thereby changing the composition of the mixture in the chamber; a means for desorbing the gas captured by the first adsorption pump; a means for desorbing the gas captured by the second adsorption pump; and a means of condensing the gas desorbed from the adsorption pumps, thereby producing a liquid with modified composition.

Aspect 26: The system of aspect 25, further comprising a valve configured to isolate the first and second adsorption pumps from the distillation pot while the first and second adsorption pumps are desorbed.

Aspect 27: The system of aspect 25, further comprising a first valve configured to isolate the first adsorption pump from the cooling pot while the gas captured by the first adsorption pump is desorbed, and a second valve configured to isolate the second adsorption pump from the cooling pot while the gas captured by the second adsorption pump is desorbed.

Aspect 28: The system of any one of aspects 25 to 27, wherein the means for condensing the gas desorbed from the adsorption pump comprises a condensing line arranged between the chamber and outlet ends of the first and second adsorption pumps.

Aspect 29: The system of aspect 28, wherein the condensing line comprises at least one of a heat exchanger and an expansion valve.

Aspect 30: The system of any one of aspects 25 to 27, wherein the means for condensing the gas desorbed from the adsorption pump comprises: a first condensing line arranged between an outlet end of the first adsorption pump and the chamber; and a second condensing line arranged between an outlet end of the second adsorption pump and the chamber.

Aspect 31: The system of aspect 30, wherein the first condensing line comprises at least one of a first heat exchanger and a first expansion valve, and wherein the second condensing line comprises at least one of a second heat exchanger and a second expansion valve.

Aspect 32: The system of aspect 31, wherein the first condensing line includes the first heat exchanger and the first expansion valve.

Aspect 33: The system of aspect 31 or 32, wherein the second condensing line includes the second heat exchanger and the second expansion valve.

Aspect 34: The system of any one of aspects 31 to 33, wherein each of the first and second expansion valves comprise a Joule-Thomson expansion valve.

Aspect 35: The system of any one of aspects 30 to 34, further comprising the cooling pot and a third condensing line arranged to pass liquid produced by the first and second condensing lines to the distillation pot.

Aspect 36: The system of aspect 35, further comprising a third heat exchanger arranged in the chamber and along the third condensing line, the third heat exchanger configured to cool the liquid to the temperature of the liquid and gaseous mixture in the chamber.

Aspect 37: The system of any one of aspects 25 to 36, wherein the means for desorbing the gas captured by the first adsorption pump comprises a first heater or a first heat switch.

Aspect 38: The system of any one of aspects 25 to 37, wherein the means for desorbing the gas captured by the second adsorption pump comprises a second heater or a second heat switch.

Aspect 39: The system of any one of aspects 25 to 38, wherein each of the first and second adsorption pumps comprise an adsorbent that captures the gas from the liquid and gaseous mixture.

Aspect 40: The system of aspect 39, further comprising first and second heat switches configured to control the temperature of the adsorbent of the first and second adsorption pumps, respectively.

Aspect 41: The system of any one of aspects 25 to 40, wherein the liquid and gaseous mixture comprises isotopes of Helium.

Aspect 42: The system of any one of aspects 25 to 40, wherein the liquid and gaseous mixture comprises isotopes of elements other than Helium.

Aspect 43: The system of any one of aspects 25 to 40, wherein the liquid and gaseous mixture comprises isotopes of a miscible liquid.

Aspect 44: A method of continuously cooling at cryogenic temperatures, the method comprising: fluidly coupling a first adsorption pump to a chamber containing liquid and gaseous coolant received from a cooling pot; when the first adsorption pump is fluidly coupled to the chamber, capturing, using the first adsorption pump, gas from the liquid and gaseous coolant, thereby lowering the temperature of the liquid and gaseous coolant in the chamber; isolating the first adsorption pump from the chamber; responsive to the isolation of the first adsorption pump from the chamber, (i) fluidly coupling a second adsorption pump to the chamber, and (ii) desorbing the gas captured by the first adsorption pump; and capturing, when the second adsorption pump is fluidly coupled to the chamber, gas from the liquid and gaseous coolant using the second adsorption pump, thereby lowering the temperature of the liquid and gaseous coolant in the chamber.

Aspect 45: The method of aspect 44, wherein desorbing the gas captured by the first adsorption pump comprises heating the first adsorption pump.

Aspect 46: The method of aspect 44 or 45, wherein isolating the first adsorption pump comprises isolating the first adsorption pump when an adsorbent of the first adsorption pump is saturated.

Aspect 47: The method of any one of aspects 44 to 46, further comprising isolating the second adsorption pump and desorbing the gas captured by the second adsorption pump responsive to the isolation of the second adsorption pump.

Aspect 48: The method of aspect 47, wherein isolating the second adsorption pump comprises isolating the second adsorption pump when an adsorbent of the second adsorption pump is saturated.

Aspect 49: The method of any one of aspects 44 to 48, wherein the acts of fluidly coupling the first adsorption pump to the chamber and fluidly coupling the second adsorption pump each comprise opening a valve arranged between the chamber and the first and second adsorption pumps, and wherein the act of isolating the first adsorption pump comprises closing the valve.

Aspect 50: The method of any one of aspects 44 to 49, wherein fluidly coupling the first adsorption pump to the chamber comprises opening a first valve arranged between the first adsorption pump and the chamber, wherein fluidly coupling the second adsorption pump to the chamber comprises opening a second valve arranged between the second adsorption pump and the chamber, and wherein isolating the first adsorption pump comprises closing the first valve.

Aspect 51: The method of aspect 50, wherein isolating the second adsorption pump comprises closing the second valve.

Aspect 52: The method of any one of aspects 44 to 51, wherein desorbing the gas captured by the second adsorption pump comprises heating the second adsorption pump.

Aspect 53: The method of any one of aspects 44 to 52, further comprising condensing the desorbed gas by passing the desorbed gas though at least one of a first heat exchanger and a first expansion valve arranged between the first adsorption pump and the chamber, thereby producing a liquid.

Aspect 54: The method of aspect 52, further comprising passing the liquid to the cooling pot via a condensing line.

Aspect 55: The method of any one of aspects 44 to 54, further comprising condensing the desorbed gas by passing the desorbed gas through at least one of a second heat exchanger and a second expansion valve arranged between the second adsorption pump and the chamber, thereby producing a liquid.

Aspect 56: The method of any one of aspects 44 to 55, wherein capturing gas from the liquid and gaseous coolant using the first adsorption pump comprises capturing gas using an adsorbent of the first adsorption pump, and wherein capturing gas from the liquid and gaseous coolant using the second adsorption pump comprises capturing gas using an adsorbent of the second adsorption pump.

Aspect 57: The method of any one of aspects 44 to 56, wherein the acts of capturing gas from the liquid and gaseous coolant using the second adsorption pump and condensing the desorbed gas from the first adsorption pump are performed at substantially the same time.

Aspect 58: The method of any one of aspects 44 to 57, wherein the liquid and gaseous coolant comprises isotopes of Helium.

Aspect 59: The method of any one of aspects 44 to 58, further comprising maintaining a substantial portion of the coolant at a temperature of less than 30K throughout the method.

The invention claimed is:

1. A refrigeration system that provides continuous cooling at cryogenic temperatures, the refrigeration system comprising:
   a chamber adapted to hold liquid and gaseous coolant received from a cooling pot;
   a first adsorption pump having an inlet end in fluid communication with the chamber, the first adsorption pump configured to capture gas from the liquid and gaseous coolant when the first adsorption pump is enabled;

a second adsorption pump having an inlet end in fluid communication with the chamber, the second adsorption pump configured to capture gas from the liquid and gaseous coolant when the second adsorption pump is enabled;

a means for desorbing the gas captured by the first adsorption pump;

a means for desorbing the gas captured by the second adsorption pump;

means for condensing the gas desorbed from the first adsorption pump; and means for condensing the gas desorbed from the second adsorption pump, wherein the means for condensing the gas desorbed from the second adsorption pump is structurally separate from the means for condensing the gas desorbed from the first adsorption pump, and wherein the means for condensing the gas desorbed from the first adsorption pump comprises a first condensing line comprising a first condenser and a first heat exchanger arranged downstream of the first condenser, and wherein the means for condensing the gas desorbed from the second adsorption pump comprises a second condensing line comprising a second condenser and a second heat exchanger arranged downstream of the second condenser.

2. The refrigeration system of claim 1, further comprising a valve configured to isolate the first and second adsorption pumps from the cooling pot while the gas captured by the first and second adsorption pumps is desorbed.

3. The refrigeration system of claim 1, further comprising a first valve configured to isolate the first adsorption pump from the cooling pot while the gas captured by the first adsorption pump is desorbed, and a second valve configured to isolate the second adsorption pump from the cooling pot while the gas captured by the second adsorption pump is desorbed.

4. The refrigeration system of claim 1, further comprising a closed cycle cryocooler arranged to dissipate heat generated by the adsorption.

5. The refrigeration system of claim 1, wherein the means for desorbing the gas captured by the first adsorption pump comprises a first heater or a first heat switch, and wherein the means for desorbing the gas captured by the second adsorption pump comprises a second heater or a second heat switch.

6. The refrigeration system of claim 1, wherein each of the first and second adsorption pumps comprise an adsorbent that captures the gas from the liquid and gaseous coolant.

7. The refrigeration system of claim 6, further comprising first and second heat switches configured to control the temperature of the adsorbent of the first and second adsorption pumps, respectively.

8. The refrigeration system of claim 1, wherein the liquid and gaseous coolant comprises helium with an isotopic weight of 3, helium with an isotopic weight of 4, or a mixture of the two helium isotopes.

9. The refrigeration system of claim 1, wherein the means for condensing the gas desorbed from the first adsorption pump is arranged between an outlet end of the first adsorption pump and the chamber, and wherein the means for condensing the gas desorbed from the second adsorption pump is arranged between an outlet end of the second adsorption pump and the chamber.

10. The refrigeration system of claim 1, further comprising a condensing line, wherein the cooling pot and the condensing line are arranged to pass liquid produced by the means for condensing the gas desorbed from the first adsorption pump and liquid produced by the means for condensing the gas desorbed from the second adsorption pump to the cooling pot.

11. The refrigeration system of claim 10, further comprising a third heat exchanger arranged in the chamber and along the condensing line, the third heat exchanger configured to cool the liquid to the temperature of the liquid and gaseous coolant in the chamber.

12. The refrigeration system of claim 1, wherein the first condensing line further comprises a first expansion valve arranged downstream of the first heat exchanger, and wherein the second condensing line further comprises a second expansion valve arranged downstream of the second heat exchanger.

13. The refrigeration system of claim 12, further comprising:

a third heat exchanger arranged within the chamber; and a third condensing line arranged between each of the first and second condensing lines and the cooling pot, the third condensing line configured to pass liquid produced by the first condensing line and liquid produced by the second condensing line through the third heat exchanger and to the cooling pot.

14. A method of continuously cooling at cryogenic temperatures, the method comprising:

fluidly coupling a first adsorption pump to a chamber containing liquid and gaseous coolant received from a cooling pot;

when the first adsorption pump is fluidly coupled to the chamber, capturing, using the first adsorption pump, gas from the liquid and gaseous coolant, thereby lowering the temperature of the liquid and gaseous coolant in the chamber;

isolating the first adsorption pump from the chamber;

responsive to the isolation of the first adsorption pump from the chamber, (i) fluidly coupling a second adsorption pump to the chamber, and (ii) desorbing the gas captured by the first adsorption pump;

capturing, when the second adsorption pump is fluidly coupled to the chamber, gas from the liquid and gaseous coolant using the second adsorption pump, thereby lowering the temperature of the liquid and gaseous coolant in the chamber;

isolating the second adsorption pump from the chamber;

responsive to the isolation of the second adsorption pump from the chamber, desorbing the gas captured by the second adsorption pump;

condensing the gas desorbed from the first adsorption pump via a first condensing line arranged between the first adsorption pump and the chamber, wherein the first condensing line comprises a first condenser and a first heat exchanger arranged downstream of the first condenser; and condensing the gas desorbed from the second adsorption pump via a second condensing line arranged between the second adsorption pump and the chamber, wherein the second condensing line is structurally separate from the first condensing line, wherein the second condensing line comprises a second condenser and a second heat exchanger arranged downstream of the second condenser.

15. The method of claim 14, wherein desorbing the gas captured by the first adsorption pump comprises heating the first adsorption pump, and wherein desorbing the gas captured by the second adsorption pump comprises heating the second adsorption pump.

16. The method of claim 14, wherein isolating the first adsorption pump comprises isolating the first adsorption pump when an adsorbent of the first adsorption pump is saturated, and wherein isolating the second adsorption pump comprises isolating the second adsorption pump when an adsorbent of the second adsorption pump is saturated.

17. The method of claim 14, wherein the acts of fluidly coupling the first adsorption pump to the chamber and fluidly coupling the second adsorption pump each comprise opening a valve arranged between the chamber and the first and second adsorption pumps, and wherein the act of isolating the first adsorption pump comprises closing the valve.

18. The method of claim 14, wherein the first condensing line further comprises a first expansion valve arranged downstream of the first heat exchanger.

19. The method of claim 14, wherein the second condensing line further comprises a second expansion valve arranged downstream of the second heat exchanger.

20. The method of claim 14, wherein capturing gas from the liquid and gaseous coolant using the first adsorption pump comprises capturing gas using an adsorbent of the first adsorption pump, and wherein capturing gas from the liquid and gaseous coolant using the second adsorption pump comprises capturing gas using an adsorbent of the second adsorption pump.

21. A refrigeration system that provides continuous cooling at cryogenic temperatures, the refrigeration system comprising:

a chamber adapted to hold liquid and gaseous coolant received from a cooling pot;

a first adsorption pump having an inlet end in fluid communication with the chamber, the first adsorption pump configured to capture gas from the liquid and gaseous coolant when the first adsorption pump is enabled;

a second adsorption pump having an inlet end in fluid communication with the chamber, the second adsorption pump configured to capture gas from the liquid and gaseous coolant when the second adsorption pump is enabled;

a means for desorbing the gas captured by the first adsorption pump;

a means for desorbing the gas captured by the second adsorption pump;

wherein the means for condensing the gas desorbed from the first adsorption pump comprises a first condensing line comprising a first condenser, a first heat exchanger arranged downstream of the first condenser, and a first expansion valve arranged downstream of the first heat exchanger, wherein the means for condensing the gas desorbed from the second adsorption pump comprises a second condensing line comprising a second condenser, a second heat exchanger arranged downstream of the second condenser, and a second expansion valve arranged downstream of the second heat exchanger, and wherein the first heat exchanger is arranged between the first condenser and the chamber.

* * * * *